Jan. 3, 1961 L. SKEEL 2,966,968
LOCKING DEVICES
Filed June 13, 1956 2 Sheets-Sheet 1

INVENTOR.
LEWIS SKEEL
BY
Emmett F. Salter
ATTORNEY

Jan. 3, 1961 L. SKEEL 2,966,968
LOCKING DEVICES
Filed June 13, 1956 2 Sheets-Sheet 2
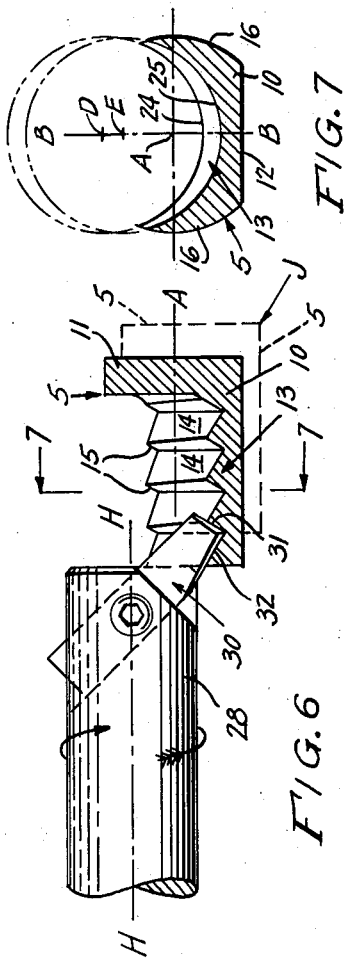
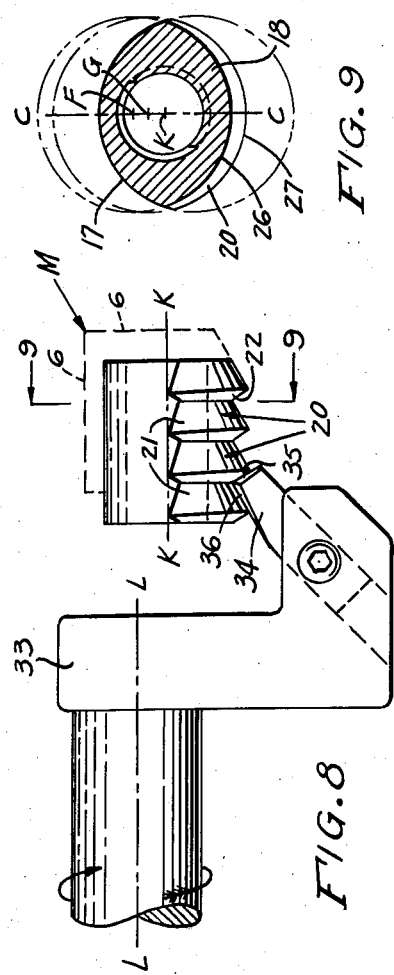
INVENTOR.
LEWIS SKEEL
BY
ATTORNEY

United States Patent Office 2,966,968
Patented Jan. 3, 1961

2,966,968

LOCKING DEVICES

Lewis Skeel, Meadville, Pa., assignor to McCrosky Tool Corporation, a corporation of Pennsylvania Filed June 13, 1956, Ser. No. 591,181

10 Claims. (Cl. 189—36)

The present invention relates to a locking device especially adapted for securing a cutting blade or tool in a tool body or support, the latter being capable of having a rotary or reciprocating motion or remaining stationary. However, it will be understood that the invention may be utilized in many other instances where it is desired to lock or fix two parts together with a simple locking device which is susceptible of ready insertion and removal and adjustable for its locking and unlocking operations.

An important object of the invention is to provide a locking device having cooperating members so constructed and arranged as to provide for rapid and substantial expansion with minimum relative axial displacement of the cooperating members and at the same time maintaining a non-seizing relation of the cooperating members so as to substantially assure self-release of such members.

Another object of the invention is to provide a simple and sturdy locking device which will produce a powerful locking action to hold the parts to be locked in place without requiring the use of special tools for the performance of the locking and unlocking functions.

A further object of the invention is to provide a locking device having complementary mating buttresses or buttress-type serrations fashioned in such a manner that the buttresses or serrations have their greatest strength or resistance to stresses at a point close to the meeting point or zone of the parts to be locked together.

A still further object of the invention is to provide complemental and mating sections of the locking device with a series of buttress-type serrations or wedging faces formed in such a way that the cooperating members are self-aligning to occupy correct positions for ready insertion and removal as well as for their locking and unlocking functions.

Another object of the invention is to provide a locking device which has a generous area of pressure contact with the wall of its receiving recess as well as the blade or the like so as to firmly secure the blade in place and at the same time avoid damage to the recess and the blade.

In general, the locking device of the present invention includes male and female members having interfitting complemental wedging faces or buttress serrations and a jack screw carried by the male member and operable to effect relative axial movement between the female and male members whereby the wedging faces will cause the female and male members to be shifted laterally to bring about the required locking action. The wedging faces or buttress serrations of the male and female members are cylindrically curved and fashioned in such a way that when considered in transverse section the same have a uniform radius and the greatest thickness or depth at the central portion of the male and female members which progressively diminishes toward each edge of the members. This construction provides for full mating engagement of the wedging faces of the male and female members and ready alignment of such members.

There is also disclosed a method by which the complemental mating serrations or wedging faces may be formed on the male and female members.

Other objects and advantages will be apparent during the course of the following description when considered in conjunction with the accompanying drawings, wherein:

Figure 6 is a side elevation of a rotary cutter which may be employed for forming the buttress-type serrations in the female member, the female member being shown in longitudinal section.

Figure 7 is a transverse section through the female member taken on the line 7—7 of Figure 6.

Figure 8 is a side elevation of a rotary cutter which may be employed for forming the buttress-type serrations upon the male locking member.

Figure 9 is a transverse section through the male member taken on the line 9—9 of Figure 8.

Figure 1:
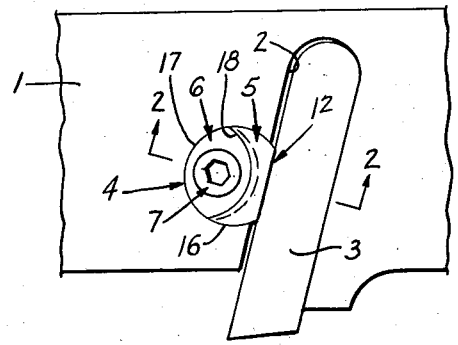
Figure 1 is a fragmentary plan view of a rotary cutter body having my locking device mounted therein and adapted to lock a cutter blade in the desired position.
Figure 2:
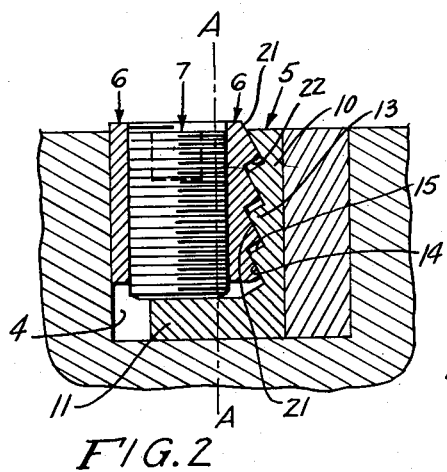
Figure 2 is a vertical section taken on the line 2—2 of Figure 1 showing the male member of the locking device raised under the jacking action of the screw to expand the device for its locking function.
Figure 3:
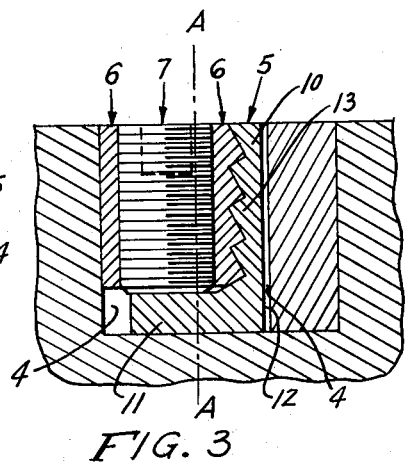
Figure 3 is a similar view showing the male member lowered and the device in non-locking position.

Referring to Figs. 1 to 3, the numeral 1 designates a support which may be stationary, reciprocatory or rotary. This support is provided with a transverse slot 2 for the reception of a cutting tool or blade 3. Adjacent the slot 2 and opening into the same is a recess 4 preferably but not necessarily cylindrically curved in shape. It will be understood that the support may be provided with a plurality of slots 2 and recesses 4 for the reception and locking of a plurality of tools or blades. While the recess has been indicated as cylindrically curved it will be understood that the shape of the recess may take other forms; for example, those of a rectangle or polygon. However, under all circumstances the exterior faces of the locking device which engage the complemental walls or faces of the recess should be correspondingly shaped, working allowance or clearance being provided for the maximum expansive action of the device without locking in the body recess, as well as ready insertion and removal of the locking device.

Figure 4:
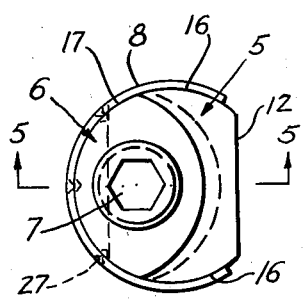
Figure 4 is a top plan view of a locking device which includes a resilient clamping sleeve for holding the male and female members in assembled relationship.
Figure 5:
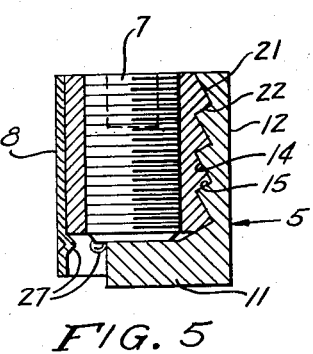
Figure 5 is a vertical section on the line 5—5 of Figure 4.

The locking device consists generally of a female member 5, a male member 6, a jack screw 7 threaded in the male member and, if desired, a resilient clamping sleeve or retainer 8, Figs. 4 and 5, serving to maintain the female and male members in assembled relation without unduly restraining relative movement between these members.

The female member 5 includes a vertical wall or portion 10 and a bottom wall or portion 11 extending horizontally therefrom, Figs. 2 and 3. The vertical wall is provided at its outer side with a flat face 12, Figs. 1, 4 and 7, shaped to effect area contact with the adjacent flat face of the blade or cutting element 3. The inner face of the vertical wall is concave and provided with a plurality of buttresses or buttress-type serrations 13, as shown in Figs. 2, 3, 6 and 7, and each serration is provided with opposing flank faces 14 and 15. It will be noted that the wedging angle of the several inclined, cylindrically curved flank faces 14 and the angle of the complemental curved flank faces of the male member, hereinafter described, is sufficiently steep to provide for rapid and substantial expansion of the cooperating members without requiring a large relative axial displacement thereof. The wedging angle is also sufficiently steep to avoid binding or seizing of the mating wedging faces of the cooperating members under the locking action so as to substantially assure self-release of the cooperating members upon retraction of the actuating screw 7. The angle of the flank faces 15 is such as to provide sufficient metal at and above the flank faces 14 to withstand adequately stresses imposed upon the flank faces 14 in the expansion and locking functions of the parts. The opposite edges of the concave face are connected to the flat face 12 by the convex faces 16 which coincide with the shape of the wall of the recess 4.

The serrations while uniform when considered in vertical section, see Figs. 2 and 3, are of varying depth or thickness when viewed in transverse section with the greatest depth or thickness at the central zone or median line B of the serrations with a progressively diminishing thickness as the serrations 13 approach and end at the convex faces 16. This is best shown in Fig. 7. This variation in depth or thickness of the serrations of the female member is occasioned by the fact that while the arcs 24 and 25, see Fig. 7, are of the same radius, their centers D and E, respectively, are offset along the vertical line B passing through the center portion of the female member. With the point of greatest depth or thickness of the serrations at the median line or central part of the female member there is provided opposite the blade 3 a zone of greatest strength or resistance to stress under working conditions. It is also clearly shown in Fig. 7, which is a transverse section, that the inclined, cylindrically curved wedging face 14 of each serration 13 has the same radius throughout but on varying or radially offset centers. This is exemplified by the arcs 24 and 25 having centers D and E, respectively, which are offset radially. In other words, each cylindrically curved wedging face conforms to the surface of a portion of an oblique cylinder.

The male member 6 is provided with a convex exterior face 17 shaped to conform with the complementary portion of the wall of the recess 4. This member is also provided with a convex interior face 18 in which is formed a series of convex buttresses or buttress-type serrations 20 complementary to the buttresses 13 of the female member and each buttress is provided with opposing flank faces 21 and 22. The angles of the flank faces 21 and 22 correspond to those of the flank faces 14 and 15 of the female member.

As in the case of the female member, the serrations 20 are uniform when considered in vertical section, Figs. 2 and 3, but are of varying depth or thickness, with the greatest depth or thickness at the central zone or median line C of the serrations, when viewed in transverse section with a diminishing thickness as the serrations approach and end at the convex face 17. This is best shown in Fig. 9. This variation in depth or thickness of the serrations of the male member is occasioned by the fact that while the arcs 26 and 27, see Fig. 9, are of the same radius, their centers F and G, respectively, are offset along the vertical line C passing through the center portion of the male member. It is also clearly illustrated in Fig. 9, which is a transverse section on the line 9—9 of Fig. 8, that the inclined, cylindrically curved wedging face 21 of each serration 20 has the same radius throughout but on varying or radially offset centers. This is exemplified by the arcs 26 and 27 having centers F and G, respectively, which are offset radially. Stated in another way, each cylindrically curved wedging face 21 conforms to the surface of a portion of an oblique cylinder.

The male member 6 is provided with a symmetrically located threaded opening or bore of substantial diameter to receive the relatively large jack screw 7. The lower end of the jack screw bears against the upper surface of the horizontal portion 11 of the female member when rotated to cause the male member to rise and force its wedging faces 21 into camming or wedging engagement with the wedging faces 14 of the female member, thus causing expansion or relative lateral movement of the male and female members into firm contact with the wall of the recess 4 and the adjacent face of the cutting blade or tool 3 to lock the blade in its selected position in the slot 2. For convenience and safety the wrench part of the jack screw 7 preferably takes the form of an "Allen" head, i.e., a recess polygonal in shape for the reception of a turning tool.

Ready alignment in the assembly and positioning of the male and female members in the tool body is facilitated by the fact that as between the male and female serrations there is only one radial position where a true interfitting relationship exists since a common center line does not exist for all portions of the mating serrations. Thus the serrations of the male and female members automatically find their proper interfitting relation and this factor assures the ready placement of the assembled members in the correct position for easy insertion in the recess 4 and later locking. This self-alignment of the male and female members is due to the deepening of the serrations toward their central or median points and also to the shape of the wedging faces thereof.

It may be desirable to provide means for holding the female and male members in assembled relation and to this end the resilient sleeve 8 biased inwardly may encompass said members as shown in Figures 4 and 5. One or more protuberances 27 formed inside the sleeve will serve to hold the sleeve in proper position in respect to the female and male members. It will be understood that when the sleeve 8 is employed the recess 4 in the body 1 will be correspondingly enlarged to receive the sleeve and the enclosed female and male members.

While several methods may be employed to produce the serrations in the female and male members of the locking device, the following procedure will be found satisfactory:

A blank to provide the vertical and bottom walls or portions of the female member is preliminarily formed and held stationary in a chuck or other suitable mechanism (not shown) for the formation of the serrations, the axis of the preliminarily formed blank being indicated at A, Fig. 6. A rotatable tool holder 28 turning about the axis H carries at its forward end a cutter or similar tool 30 for forming the serrations. The tool 30 is provided with two beveled edges 31 and 32 at substantially right angles to each other, the former being sharpened and having cutting engagement with the blank of the female member as shown in Fig. 6, while the latter clears or is out of contact with the blank. It will be noticed that the tool 30 rotates about the axis H, Fig. 6. The female member is fed toward the rotating cutting tool 30 by a compounded horizontal and vertical movement as indicated by the arrow J in Fig. 6. The dotted lines in this figure represent the initial position of the female member at the time the tool 30 makes the first cut toward forming each serration at which time the tool axis H coincides with the center D, Fig. 7. The full lines illustrate the position of the female member at the final cut of the tool in the completion of each serration at which time the tool axis H coincides with center E, Fig. 7. The completed serration is represented by the arcs 24 and 25 in Fig. 7 where it will be observed that the greatest depth or thickness thereof is along the median line B and progressively diminishes toward the convex faces 16. In Fig. 7 the center of the arc 24 is D and the center of the arc 25 is E. It will also be apparent from Fig. 7, which is a transverse section, that the inclined, cylindrically curved wedging face of each serration has the same radius throughout but on varying or radially offset centers.

The formation of the male member 6 is illustrated in Figures 8 and 9. Here the preliminarily formed blank for the male member is held stationary in a chuck or other suitable mechanism (not shown) for the formation of the serrations, the axis of the preliminarily formed blank being indicated at K, Fig. 8. A rotatable tool holder 33 turning about the axis L carries at its forward end the cutter or similar tool 34 for forming the serrations. The tool is provided with two beveled edges 35 and 36 at substantially right angles to each other, the former being sharpened and having cutting engagement with the blank of the male member, while the latter clears or is out of contact with the blank. It will be noticed that the tool 34 rotates about the axis L. The male member is fed toward the rotating cutting tool 34 by a compounded horizontal and vertical movement as indicated by the arrow M in Fig. 8. The dotted lines in this figure represent the initial position of the male member at the time the tool 34 makes its first cut toward forming each serration at which time the tool axis L coincides with center G, Fig. 9. The full lines illustrate the position of the male member at the final cut of the tool in the completion of each serration at which time the tool axis L coincides with center F, Fig. 9. The completed serration is represented by the arcs 26 and 27 in Fig. 9 where it will be seen that the greatest depth or thickness thereof is along the median line C and progressively diminishes toward the convex face 17. In Fig. 9 the center of the arc 26 is F and the center of the arc 27 is G. It will also be clear from Fig. 9, which is a transverse section, that the inclined, cylindrically curved wedging faces 21 of the serrations 20 have the same radius throughout but on varying or radially offset centers.

While for the purpose of illustration a single-point cutting tool is shown in Figures 6 and 8 for the successive cutting and formation of the serrations of the female and male members, respectively, it will be understood that a multiple-fluted tool sufficient to form or cut all serrations simultaneously may be utilized for rapid production.

What is claimed is:

1. A locking device adapted for insertion between a pair of members which are to be locked against relative movement comprising laterally movable female and male members having complementary segmental engaging portions, the segmental portion of said female member being provided with a longitudinal series of arcuate concave serrations having inclined wedging faces, the segmental portion of said male member being provided with a longitudinal series of arcuate convex serrations having inclined wedging faces, said first and second-named serrations having interfitting engagement, the curvature of said first and second-named wedging faces conforming to the surface of a portion of an oblique cylinder and means for effecting relative axial movement between said female and male members to bring said wedging faces into operative engagement whereby said male and female members are forced bodily laterally into locking engagement with the members to be locked in place.

2. An adjustable locking device adapted for insertion between a pair of members which are to be locked against relative movement, said device comprising laterally movable female and male adjustable locking elements having complementary segmental engaging portions, the segmental portion of said female element being provided with a longitudinal series of arcuate serrations having wedging faces which are concave and cylindrically curved and inclined, said cylindrically curved wedging faces having a uniform radius, the segmental portion of said male element being provided with a longitudinal series of arcuate serrations having wedging faces which are convex and cylindrically curved and inclined, the convex wedging faces of the male element having a uniform radius which corresponds to the radius of the concave wedging faces of the female element, the curvature of said convex and concave wedging faces conforming to the surface of a portion of an oblique cylinder the female and male elements being assembled so that the convex faces contact the concave faces, and means to effect a relative longitudinal movement between the male and female elements to bring said wedging faces into operative engagement whereby said female and male members are forced bodily laterally into locking engagement with the members to be locked in place.

3. An adjustable locking device adapted for insertion between a pair of members which are to be locked against relative movement, said device comprising laterally movable female and male adjustable locking elements having complementary segmental engaging portions, the segmental portion of said female element being provided with a longitudinal series of arcuate serrations having wedging faces which are concave and cylindrically curved and inclined, said cylindrically curved wedging faces having a uniform radius, the segmental portion of said male element being provided with a longitudinal series of arcuate serrations having wedging faces which are convex and cylindrically curved and inclined, the convex wedging faces of the male element having a uniform radius which corresponds to the radius of the concave wedging faces of the female element, the curvature of said convex and concave wedging faces conforming to the surface of a portion of an oblique cylinder the female and male elements being assembled so that the convex faces contact the concave faces, a horizontal foot portion carried by one end of said female element, and a screw carried by said male element and engageable with said foot portion to move the male element longitudinally with respect to the female element.

4. A locking device adapted for insertion between a pair of members which are to be locked against relative movement comprising laterally movable male and female members having complementary segmental portions provided with interfitting inclined arcuate wedging faces, the curvature of said wedging faces conforming to the surface of a portion of an oblique cylinder and means for effecting relative axial movement between said male and female members to bring said wedging faces into operative engagement whereby said male and female members are forced bodily laterally into locking engagement with the members to be locked in place.

5. The invention as defined in claim 4, said segmental portions being of progressively increasing depth from their ends toward the central portions thereof whereby a self-centering of said female and male members is effected.

6. A locking device adapted for insertion between a pair of members which are to be locked against relative movement comprising laterally movable male and female members having complementary segmental portions provided with interfitting buttress-type serrations having inclined arcuate wedging faces, the curvature of said wedging faces conforming to the surface of a portion of an oblique cylinder, means for effecting relative axial movement between said male and female members to bring said wedging faces into operative engagement whereby said male and female members are forced bodily laterally into locking engagement with the members to be locked in place, and a resilient sleeve embracing said male and female members for holding the same in assembled relation.

7. A locking device adapted for insertion between a pair of members which are to be locked against relative movement comprising cooperating laterally movable male and female members, said female member including a segmental vertical wall having a flat exterior face and a concave interior face, a plurality of concave buttress-type serrations formed in said interior face, said female member having a bottom wall extending horizontally from said vertical wall, said male member having convexed exterior and interior faces, said interior face being provided with a plurality of convex buttress-type serrations complemental to and engageable with the serrations of the female member, said serrations being provided with arcuate wedging faces having a curvature conforming to the surface of a portion of an oblique cylinder and a screw carried by said male member and engageable with the horizontal bottom wall of the female member for effecting relative axial movement between said female and male members to bring said serrations into wedging engagement whereby said female and male members are forced bodily laterally into locking contact with the members to be locked in place.

8. The invention defined in claim 7, the thickness of the serrations of the female and male members being greater at the central part than at the ends thereof.

9. A locking device adapted for insertion between a pair of members which are to be locked against relative movement comprising a female member having at least one segmental vertical wall and a bottom wall extending horizontally therefrom, a longitudinal series of serrations having wedging faces of inclined and arcuate formation provided in the vertical wall, the depth of the serrations being greatest at the central portion of the serrations as viewed in a transverse plane and progressively diminishing in depth toward the opposite ends thereof, a male member provided with a substantially symmetrically located threaded bore and having at least one vertical wall matching and engaging a part to be locked and an opposite wall provided with a longitudinal series of serrations fitting and engaging the serrations in said female member, the wedging faces of said first and second-named serrations having a uniform radius on varying centers and conforming to the curvature of the surface of a portion of an oblique cylinder, and a screw mounted in said threaded bore in the male member and bearing against the horizontal bottom wall of the female member whereby upon rotation of the screw in one direction the serrations of the male member will bear against the serrations in the female member and thereby displace bodily laterally and relatively said female and male members into locking engagement with the members to be locked in place.

10. A locking device adapted to lock an adjustable element in a recessed body comprising a first locking member arranged in the recessed body, a second locking member disposed between and engaging said first locking member and the adjustable element which is adapted to be locked in an adjusted position in the recessed body, said first and second-named locking members having complementary segmental male and female portions provided with inclined arcuate wedging faces, the curvature of said wedging faces conforming to the surface of a portion of an oblique cylinder, and means for effecting relative axial movement between said locking members to bring said wedging faces into operative engagement to move said second locking member laterally away from said first locking member and into locking engagement with the adjustable element.

References Cited in the file of this patent

UNITED STATES PATENTS

| | | |
|---|---|---|
| 328,139 | Patten | Oct. 13, 1885 |
| 530,963 | Rhodes | Dec. 18, 1894 |
| 777,399 | Church | Dec. 13, 1904 |
| 806,406 | Farrington | Dec. 5, 1905 |
| 987,381 | Law | Mar. 21, 1911 |
| 1,112,069 | Kennedy | Sept. 29, 1914 |
| 1,116,545 | Barrett | Nov. 10, 1914 |
| 1,358,013 | Miller | Nov. 9, 1920 |

FOREIGN PATENTS

| | | |
|---|---|---|
| 134,254 | Sweden | Jan. 15, 1952 |